US009130447B2

(12) United States Patent
Aizawa et al.

(10) Patent No.: US 9,130,447 B2
(45) Date of Patent: Sep. 8, 2015

(54) ROTOR CORE AND SUPERCONDUCTING ROTATING MACHINE WITH THE ROTOR CORE

(75) Inventors: Kiyoshi Aizawa, Kobe (JP); Katsuya Umemoto, Akashi (JP); Minoru Yokoyama, Abiko (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 276 days.

(21) Appl. No.: 13/496,764

(22) PCT Filed: Nov. 8, 2010

(86) PCT No.: PCT/JP2010/069834
§ 371 (c)(1),
(2), (4) Date: Mar. 16, 2012

(87) PCT Pub. No.: WO2012/063307
PCT Pub. Date: May 18, 2012

(65) Prior Publication Data
US 2012/0274161 A1    Nov. 1, 2012

(51) Int. Cl.
*H02K 9/16*    (2006.01)
*H02K 55/04*    (2006.01)

(52) U.S. Cl.
CPC .................. *H02K 55/04* (2013.01); *H02K 9/16* (2013.01); *Y02E 40/625* (2013.01)

(58) Field of Classification Search
CPC ............ H02K 9/00; H02K 55/04; H02K 9/16
USPC .......................... 310/61, 52, 54, 55, 58, 59, 64
See application file for complete search history.

(56) References Cited

U.S. PATENT DOCUMENTS

| 4,126,798 | A | * | 11/1978 | Carr et al. ...................... 310/204 |
| 4,356,700 | A | | 11/1982 | Eckels et al. |
| 5,548,168 | A | | 8/1996 | Laskaris et al. |
| 5,889,342 | A | | 3/1999 | Hasebe et al. |
| 8,338,995 | B2 | * | 12/2012 | Lee et al. ......................... 310/54 |

(Continued)

FOREIGN PATENT DOCUMENTS

| CA | 1 148 191 A | 6/1983 |
| CN | 201351581 Y | 11/2009 |

(Continued)

OTHER PUBLICATIONS

"adjacent, adj. and n." OED Online. Oxford University Press, Mar. 2014. Web. Mar. 31, 2014.*

(Continued)

*Primary Examiner* — Thomas Truong
(74) *Attorney, Agent, or Firm* — Oliff PLC

(57) ABSTRACT

Provided are a rotor core, a method for cooling a rotor core, and a superconducting rotating machine, capable of effectively and uniformly cooling superconducting coils without causing cold brittleness in an extremely low temperature. The rotor core 10, which is made of a substantially hollow cylindrical member of nonmagnetic material, has a cylindrical cavity 13 defined therein and extending in the longitudinal axis of the member. Helium gas 300 is delivered in the rotor core 10 from the proximal to distal sides and vice versa, which ensures a uniform cooling of the rotor core 10. This also ensures a uniform and effective cooling of the superconducting coils.

5 Claims, 4 Drawing Sheets

(56) References Cited

U.S. PATENT DOCUMENTS

2003/0038560 A1 2/2003 Wang
2007/0296287 A1* 12/2007 Okazaki et al. ................ 310/64

FOREIGN PATENT DOCUMENTS

| | | |
|---|---|---|
| JP | A-52-006901 | 1/1977 |
| JP | A-52-041807 | 3/1977 |
| JP | A-57-181990 | 11/1982 |
| JP | A-59-6770 | 1/1984 |
| JP | A-60-250929 | 12/1985 |
| JP | U-63-109806 | 7/1988 |
| JP | A-4-266469 | 9/1992 |
| JP | A-06-302869 | 10/1994 |
| JP | A-8-168235 | 6/1996 |
| JP | A-10-009696 | 1/1998 |
| JP | A-10-62087 | 3/1998 |
| JP | A-2003-125573 | 4/2003 |
| JP | A-2003-151822 | 5/2003 |
| WO | WO 98/02953 A1 | 1/1998 |

OTHER PUBLICATIONS

Japanese Office Action issued in Japanese Application No. 2009-186587 mailed Sep. 10, 2013 (with translation).
Dec. 7, 2010 International Search Report issued in Japanese Patent Application No. PCT/JP2010/069834 (with translation).
Jul. 18, 2014 Chinese Office Action issued in Chinese Patent Application No. 201080049563.X (with English Translation).
Jan. 9, 2015 Office Action issued in Chinese Application No. 201080049563.X.

* cited by examiner

ROTOR CORE AND SUPERCONDUCTING ROTATING MACHINE WITH THE ROTOR CORE

FIELD OF THE INVENTION

The present invention relates to a structure of a rotor core for use with a superconducting rotating machine, a method for cooling the rotor core, and a superconducting rotating machine with the rotor core.

BACKGROUND OF THE INVENTION

Typically, the superconducting rotating machine has a stator and a rotor, electromagnetically connected with each other. The rotor comprises a multipole rotor core and one or more field coils mounted on the rotor core. The rotor core is made of a magnetic material such as iron, with a longitudinal axis extending along a rotational axis of the rotating machine (see, for example, JP 2003-125573 A).

In order to maintain the superconductivity of the superconducting coils on the rotor core, the superconducting coils are cooled down to approximately 30K, for example, through a conduction cooling. Conventionally, various techniques have been known for cooling the superconducting coils of the rotor core, such as one in which the superconducting coils are immersed in a cryogen such as liquid helium or liquid nitrogen, or another in which the superconducting coils are brought into contact with a cold head of the cooling machine so that cooling power generated in the cold head is transferred to the superconducting coils (see, for example, JP 6-302869 A, JP 10-9696 A, and JP 2003-151822 A).

The rotor core disclosed in JP 2003-125573 A is made of a heavy solid member and therefore has a high heat capacity, which needs a long time for a uniform cooling of the rotor core in its entirety down to a certain temperature. Also, an incorporation of the superconducting coils into the electromagnetic device may cause a very high magnetic field to result in a saturation of a magnetic field of the magnetic member if it is made of iron. This prevents such material from being used for the magnetic member. Further, as described above, the superconducting coils should be cooled down to approximately 30K, for example, in order to maintain the superconductivity of the superconducting coils. In the meantime, the carbon steel including iron can result in cold brittleness at the extremely low temperature of 30K. To prevent this, the rotor core should be made of a material with high resistance against the cold brittleness.

According to the cooling methods disclosed in JP 6-302869 A, JP 10-9696 A, and JP 2003-151822 A in which the superconducting coils are immersed in the cryogen such as liquid helium or liquid nitrogen, the extremely cooled medium is transported into a container for receiving and cooling the superconducting coils, which requires various facilities and special cares for handling the cooled medium and, therefore, results in various disadvantages in spaces and costs for facility installations and in maintenance. In addition, it is relatively difficult to control the cooling temperature.

According to another cooling method in which the cold head of the cooling machine is made into contact with the superconducting coils for its cooling, the cooling machine is mounted on the rotating rotor core, which results in that the cooling machine is rotated with the rotor core. This needs additional weight and space for rotating the cooling machine. Also, a continuous supply of the pressurized helium gas needs that a rotating seal mechanism is mounted on the rotational cooling machine. Actually, however, a rotating seal mechanism with an extremely high sealing property is not available at the moment and, therefore, this method seems to be impractical.

SUMMARY OF THE INVENTION

Accordingly, the present invention is to overcome those problems and an object thereof is to provide a rotor core, a method for cooling the rotor core, and a superconducting rotating machine equipped with the rotor core, which allows the superconducting coils to be cooled effectively and uniformly without causing unwanted cold brittleness at an extremely low temperature.

According to the invention, a rotor core use in a superconducting rotating machine, comprises:
 a substantially hollow cylindrical member made of non-magnetic material,
 the cylindrical member having
  a longitudinal axis,
  a cylindrical cavity defined therein and extending along the longitudinal axis;
  a plurality of recesses defined on an outer peripheral surface of the cylindrical member for receiving superconducting coils, and
  at least two cryogen passages defined therein adjacent the cylindrical cavity and extending therethrough between a proximal side and a distal side thereof.

The rotor core may have rod-like members each coaxially disposed in the cryogen passage to leave a space gap around the rod-like member.

Preferably, either an inner surface of each of the cryogen passages or an outer surface of each of the rod-like members has convex or concave portions defined therein and extending in a peripheral direction thereof.

The cryogen passages have first cryogen passages for guiding the cryogen from the proximal side to the distal side and second cryogen passages for guiding the cryogen from the distal side to the proximal side.

A superconducting rotating machine having a stator and a rotor, electromagnetically connected to each other, according to the invention, comprises a rotor core defined in claim 1.

According to the invention, the superconductive windings are effectively and uniformly cooled without causing cold brittleness in an extremely cold temperature.

DETAILED DESCRIPTION OF THE PREFERRED EMBODIMENTS

Hereinafter, embodiments of a rotor core, a method for cooling the rotor core, and a superconducting rotating machine according to the invention will be described with reference to the accompanying drawings. Although specific terminologies such as "proximal", "distal" and others including any one of them are used in the following descriptions for the better understanding of the invention, a protective scope of the invention should not be limited by the use of those terminologies.

To identify the positions of structural elements of the rotor core, a side or portion of the rotor core adjacent a cryogen supply is referred to as "proximal side 100" and an opposite side or portion of the rotor core adjacent an output shaft of a superconducting motor is referred to as "distal side 100" in the following descriptions.

1. Structure of Rotor Core

Figure 1:
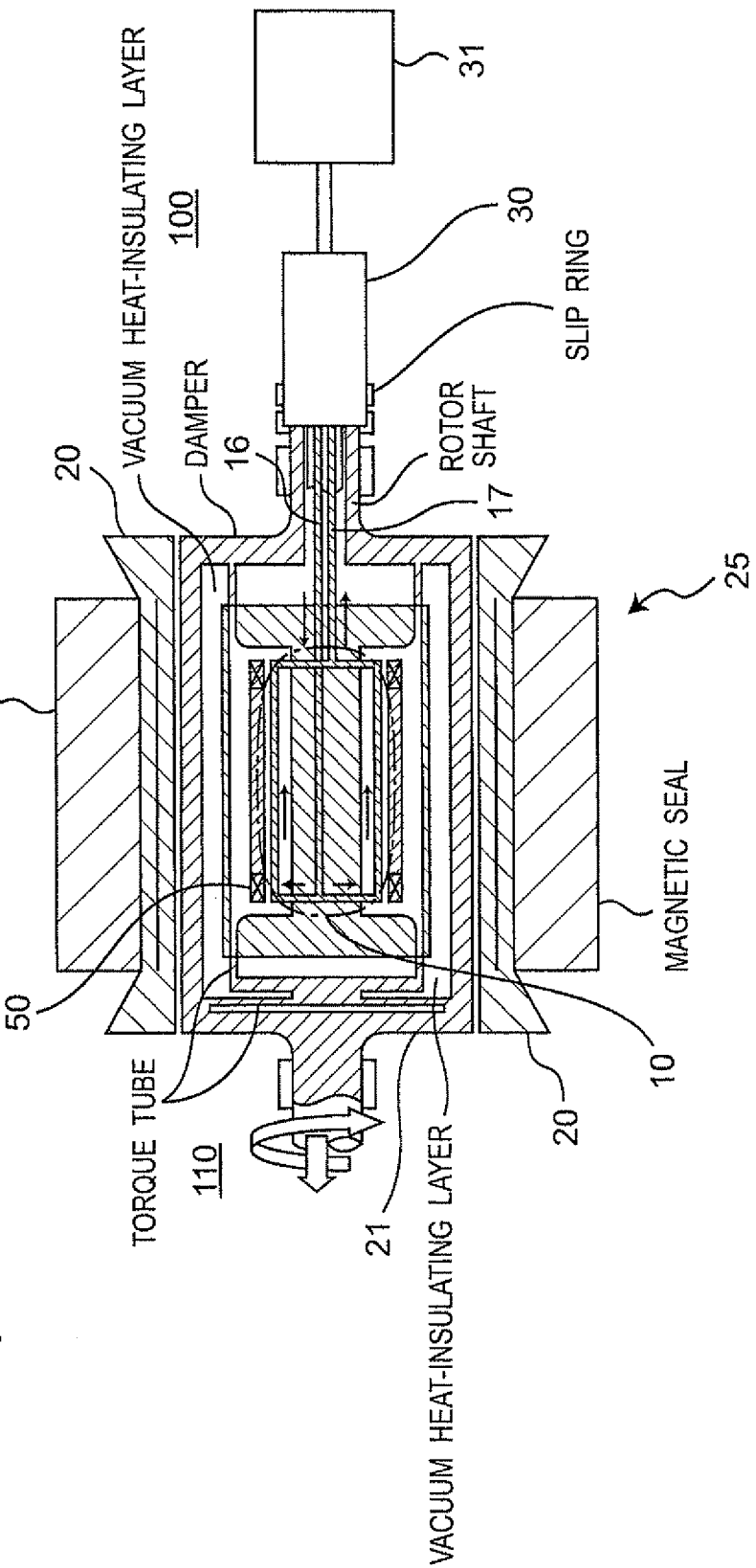
FIG. 1 is a schematic structural view of an entire system of a superconducting motor.

As shown in FIG. 1, the rotor core 10 according to an embodiment of the invention is incorporated in a superconducting motor 25 with a stator 20 and a rotor 21, electromagnetically connected with each other. The rotor core 10 is connected to cryogen supply and return tubes 16 and 17 connecting between a cryogen supply and return unit 30 and a cooling unit 31 so that a body of the rotor core is cooled by a cryogen such as helium gas in this embodiment, supplied from the cryogen supply and return unit 30 and also superconducting coils 50 mounted on the rotor core 10 are cooled down to at approximately 30K through the conduction cooling by the body of the rotor core 10 to maintain the superconductivity of the superconducting coils 50.

As described above, the usage of the superconducting coils in the electromagnetic device causes a very high magnetic filed, resulting in a saturation of the magnetic field generated by the magnetic material such as iron. Also, the extremely low temperature of approximately 30K causes cold brittleness in the carbon steel. Therefore, used for the rotor core 10 in this embodiment is a non-magnetic material with an improved low-temperature property, such as SUS316.

Figure 2:
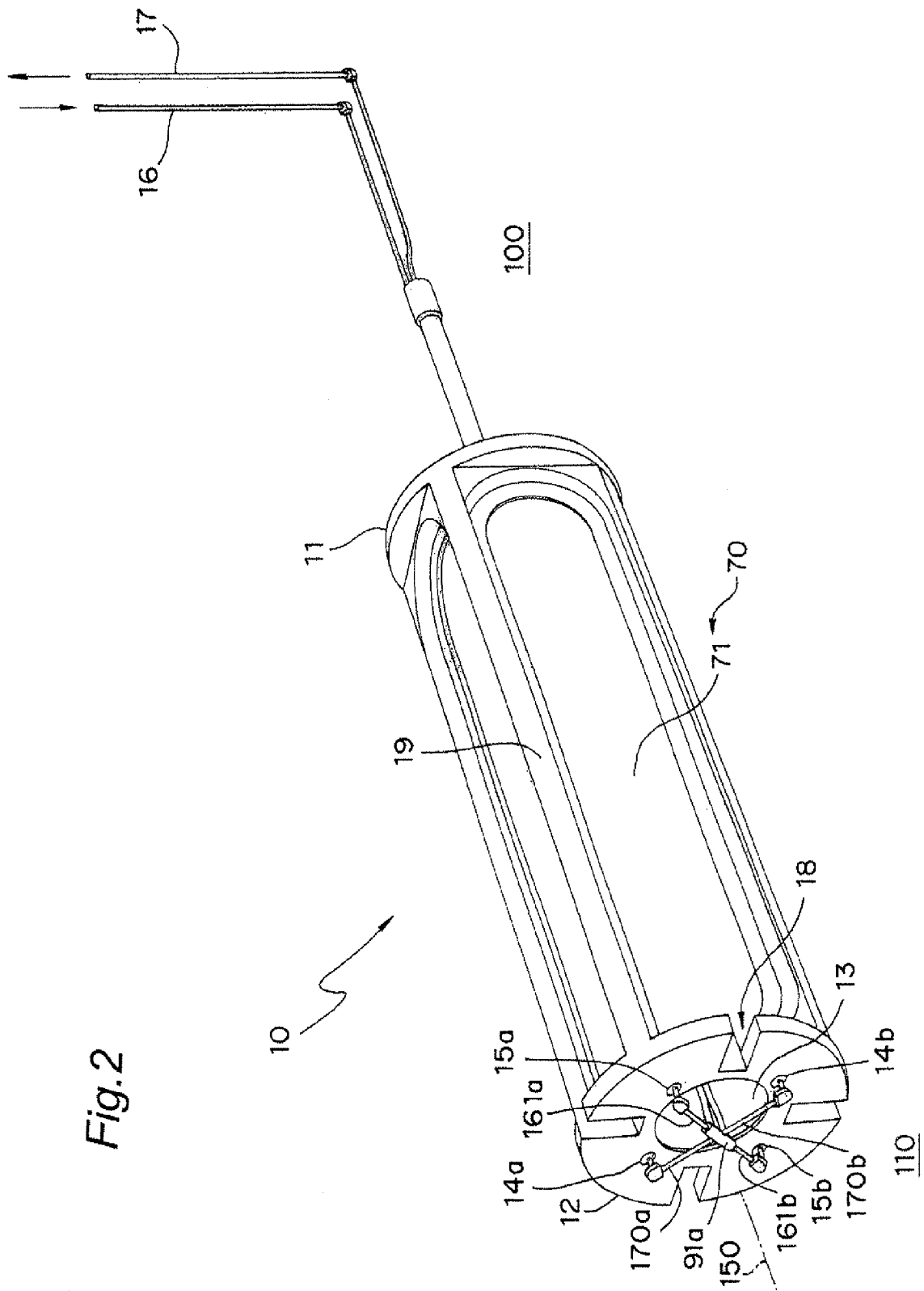
FIG. 2 is a schematic perspective view of a structure of a rotor core according to an embodiment of the invention.

As shown in FIG. 2, because the rotor core 10 needs to transmit a high torque within the superconducting motor 25, it is preferably manufactured by cutting a solid cylindrical material of SUS316 into a hollow cylinder. The hollowed cylindrical rotor core 10 contributes a weight saving of the rotor core 10, which reduces its heat capacity compared with the conventional solid rotor core.

As shown in the drawing, the rotor core 10 comprises flanges 11 and 12 provided on proximal and distal sides 100 and 110, respectively, and a cylindrical cavity 13 defined therein and extending in a direction along the central axis 150 of the rotor core 10. The rotor core 10 also comprises cryogen passages 14a, 14b, 15a and 15b defined therein to extend through from the proximal side 100 to the distal side 110 of the rotor core and provided at a regular interval of 90 degrees in the circumferential direction of the cylindrical cavity 13. The cryogen supply and return tubes 16 and 17 are positioned within the cylindrical cavity 13 from the proximal side 100 to the distal side 110 of the rotor core 10.

Figure 5:
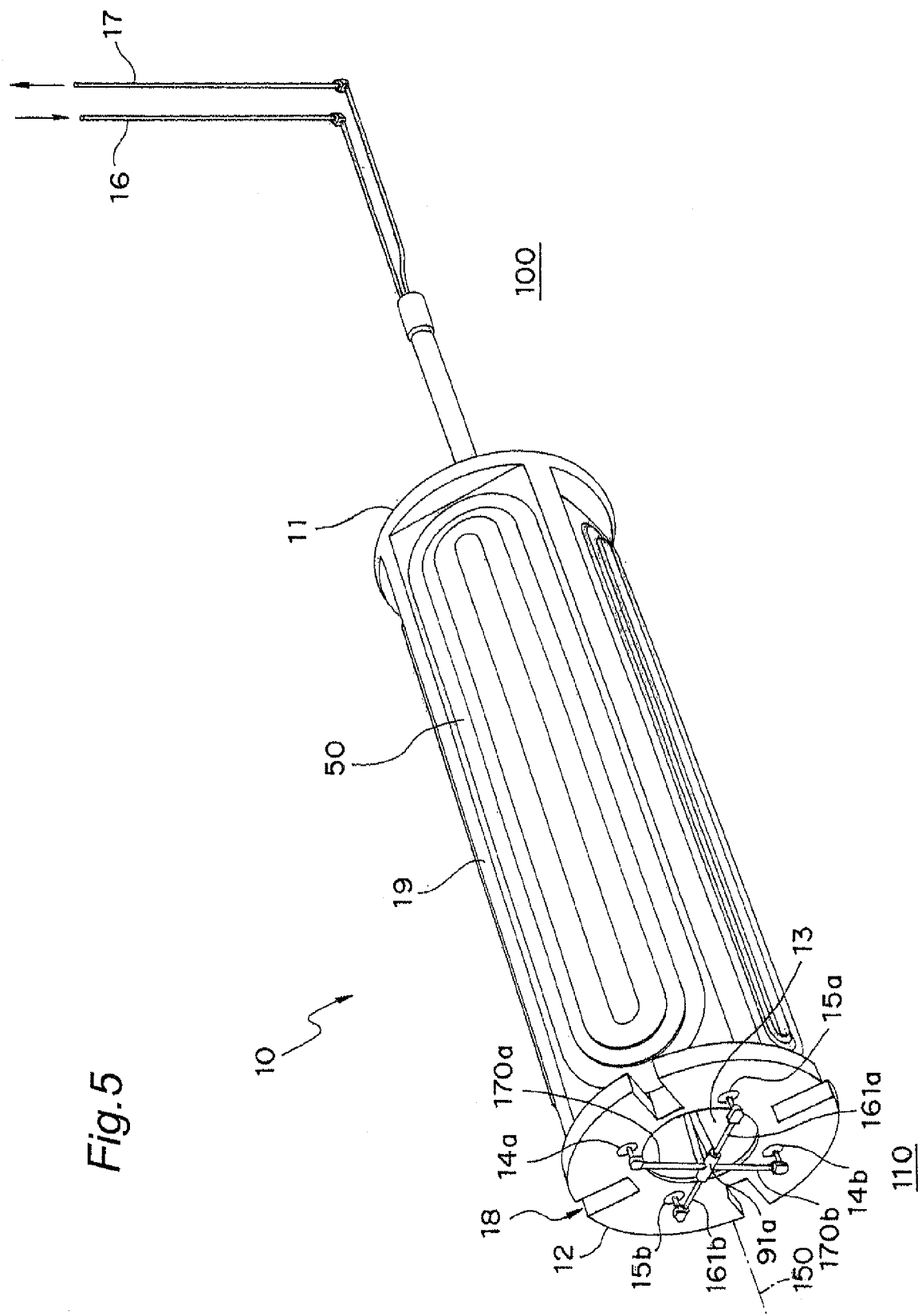
FIG. 5 is a perspective view showing the rotor core with superconducting coils in the form of racing track mounted thereon.

The flange 12 of the rotor core 10 has four cutouts 18 defined therein. As shown in the drawing, the rotor core 10 has recesses 70 for receiving superconducting coils 50 each in the form of race circuit, defined at respective outer circumferential portions of the rotor core 10 corresponding to the cutouts 18. Each recess 70 is spaced away from the neighborhood recesses by partition ribs 19 defined in the rotor core 10. As shown in FIG. 5, the recesses 70 are designed so that the superconducting coils 50 fit well in the associated recesses by placing the windings 50 on the bottoms 71 of the recesses 70.

Figure 3:
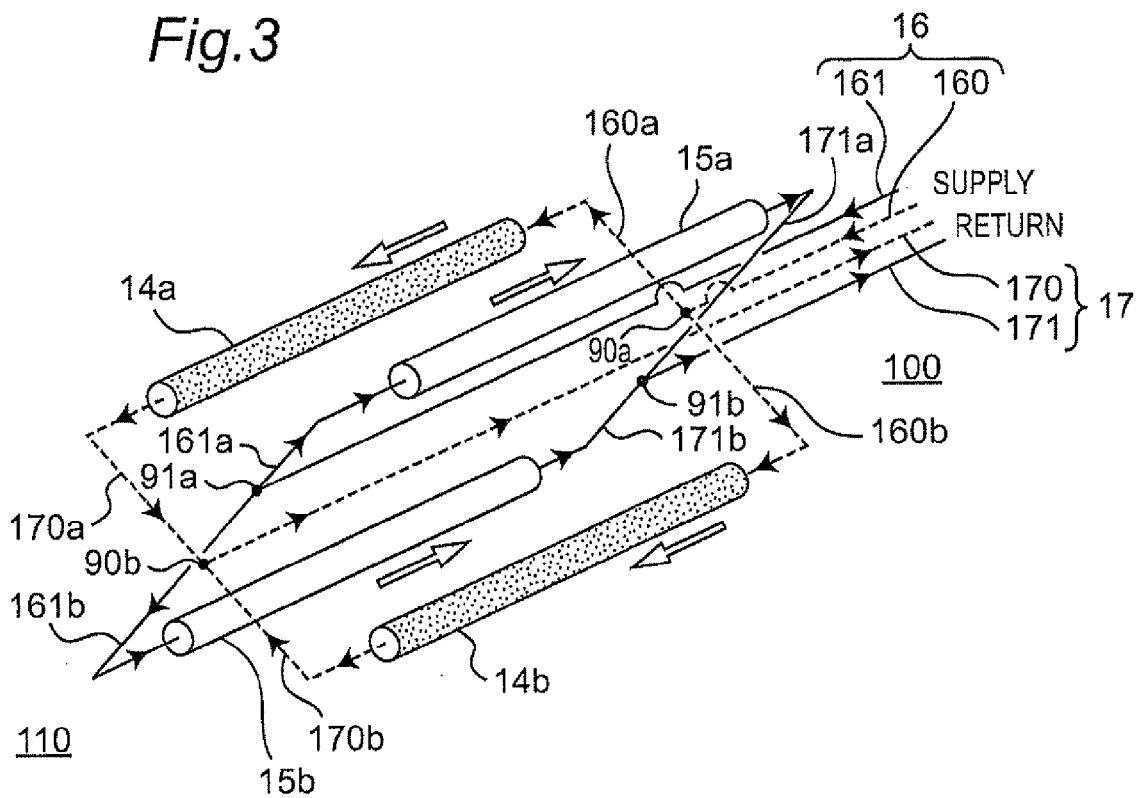
FIG. 3 is a perspective view showing a flowing direction and supply and return passages of a cooling medium of the rotor core.

Referring to FIG. 3, discussions will be made in detail to a circulation path along which the helium gas from the cryogen supply and return unit 30 is transported through the passages 14a, 14b, 15a, and 15c in the rotor core 10 and then returned to the unit 30. As shown in the drawing, the supply tube 16 for supplying the helium gas from the unit 30 to the rotor 10 is divided into two supply tube branches 160 and 161. The supply tube branch 160 is divided at a connection 90a provided on the proximal side 100 adjacent the unit 30 into sub-branches 160a and 160b connected to the proximal ends of the cryogen passages 14a and 14b, respectively.

The distal ends of the cryogen passages 14a and 14b are connected to one ends of sub-branches 170a and 170b, respectively. The opposite ends of the sub-branches 170a and 170b are connected at a connection 90b provided on the distal side 110 of the rotor core 10, adjacent the motor output shaft, to the return tube branch 170 extending through the cylindrical cavity 13 of the rotor core 10.

The supply tube branch 161 is extended through within the cylindrical cavity 13 of the rotor core and then divided at a connection 91a provided on the distal side 110 of the rotor core 10, adjacent the motor output shaft, into sub-branches 161a and 161b connected to the distal ends of the cryogen passages 15a and 15b, respectively.

The proximal ends of the cryogen passages 15a and 15b are connected with one ends of sub-branches 171a and 171b, respectively. The opposite ends of the sub-branches 171a and 171b are connected at a connection 91b provided on the proximal side 100 of the rotor core 10, adjacent the unit 30, to the return tube branch 171. The return tube branches 170 and 171 are connected at a position on the proximal side 100 with each other to form the cryogen return tube 17.

As described above, the diametrically opposed cryogen passages 14a and 14b form a pair of passages in which the helium gas flows from the proximal side 100 to the distal side 110, i.e., in a direction from the cryogen supply unit 30 to the motor output shaft. The diametrically opposed cryogen passages 15a and 15b form a pair of passages in which the helium gas flow from the distal side 110 to the proximal side 100, i.e., in a direction from the motor output shaft to the cryogen supply unit 30.

In this embodiment, the rotor core 10 has first and second cryogen passages provided around and outside the cylindrical cavity 13 of the rotor core 10, i.e., the first cryogen passages for guiding the cryogen branched radially outwardly on the proximal side 100 from the proximal side 100 to the distal side 110 and second cryogen passages for guiding the cryogen branched radially outwardly on the distal side 110 from the distal side 110 to the proximal side 100 through the rotor core 10, allowing the cryogen to be transported from the proximal side 100 to the distal side 110 and vice versa and, as a result, ensuring the longitudinally elongated rotor core to be uniformly cooled.

Although four cryogen passages 14a, 14b, 15a and 15b are provided around and outside the cylindrical cavity 13 of the rotor core 10, various modifications can be made to the embodiment. For example, six or eight cooling passages may be provided to the rotor core.

Figure 4:
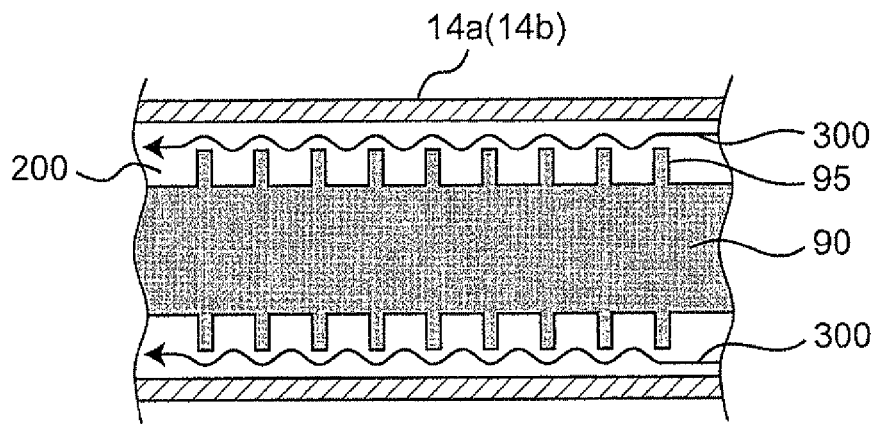
FIG. 4 is a cross sectional view showing a detailed structure of the cooling passages formed in the rotor core.

Referring next to FIG. 4, an internal structure of the cryogen passages 14a, 14b, 15a, and 15c will be described below. It should be noted that FIG. 4 shows the internal structure of the cryogen passages 14a and 14b and a difference between the passages 14a and 14b and the passages 15a and 15 resides only in the fact that the helium gas flows in the opposite directions.

As shown in FIG. 4, arranged within each of the cryogen cavities 14a and 14a is a solid core member 90 extending coaxially with the longitudinal axis of the cavity, leaving a cylindrical space 200 around the core member. The core member 90 has a number of ring-like turbulence promoters 95 at a regular interval in the longitudinal direction. The core member 90 may be made of a rod-like member such as hollow tube or square bar, rather than the solid cylinder.

The existence of the turbulence promoters 95 on the core member 90 prevents a formation of a boundary layer on the inner surfaces of the cryogen passages 14a, 14b, which would harm heat transfer and decrease the heat transfer efficiency between the cryogen or helium gas 300 flowing in the passages and the rotor core 10, The turbulence promoters 95 also promote a formation of turbulence in the passages 14a, 14b, causing the major turbulence flow of the helium gas 300 to make frequent contacts with the inner surface of the passages 14a, 14b and improving the resultant heat transfer efficiency.

Although in the previous embodiment a number of turbulence promoters 95 are provided on the periphery of the core member 90 at a regular interval in the longitudinal direction, they may be replaced by a helical plate, a number of recesses or concaves formed on the outer peripheral surface of the core member 90, a number of peripherally extending projections or convexes on the inner peripheral surface of the cryogen passages, or other various structures capable of preventing the formation of the boundary layer.

2. Cooling Operation for the Rotor Core

Referring to FIGS. 1-4, the cooling operation for the rotor core 10 will be described below. In this operation, the helium gas 300 is cooled down to a certain degree by the two-stage cooling unit 30, for example, and then supplied through the cryogen supply and return unit 30 into the cryogen supply tube 16. Then, as shown in FIG. 3, the helium gas 300 from the tube 16 is supplied to one supply tube branch 160 and the other supply tube branch 161, separated from the supply tube branch 160 and extending through the hollow cavity of the rotor core 10.

The helium gas 300 flowing in the supply tube branch 160 is branched at the proximal side 100 of the rotor core 10 into the sub-branches 160a and 160b and then into the cryogen passages 14a and 14b from the proximal ends thereof. As shown in FIG. 4, the helium gas 300 flowing in the cryogen passages 14a and 14b make contacts with the turbulence promoters 95 on the core member 90, which prevents the formation of the boundary layer on the inner surfaces of the passages 14a and 14b and promotes the formation of the turbulence. This results in that the major portion of the turbulent helium gas 300 is brought into contacts with the inner surface of the passages 14a and 14b and thereby the rotor core 10 is effectively cooled.

After the heat exchange in the passages 14a and 14b, the helium gas 300 is delivered from the distal ends of the passages 14a and 14b through the sub-branches 170a and 17b into the return tube branch 170 on the distal side 110 of the rotor core 10. The helium gas 300 is delivered from the return tube branch 170 into the supply and return tube 17.

The helium gas 300 flowing in the supply tube branch 161 is branched on the distal side 110 of the rotor core 10 into the passages 15a and 15b through the distal ends thereof. As described above, the helium gas 300 in the passages 15a and 15b cools the body of the rotor core 10 effectively.

The helium gas 300 which is heat-exchanged in the passages 15a and 15b is discharged from the distal ends thereof and collected through the sub-branches 171a and 171b on the proximal side 100 of the rotor core 10 into the return tube branch 171 and then delivered to the supply and return tube 17.

As described above, the rotor core 10 according to the embodiment transports the cryogen from the proximal side 100 to the distal side 110 and vice versa, which results in that the elongate rotor core 10 is uniformly cooled.

As a result, the cold energy of the cryogen flowing in the passages 14a, 14b, 15a, and 15b is transferred through the entirety of bottom surfaces 71 of the rotor core 10 to the superconducting coils 50 fitted in the recesses 70, so that the coils 50 are cooled uniformly and effectively down to a certain temperature.

As described above, because the rotor core 10 according to the embodiment of the invention is made of the substantially hollow cylindrical non-magnetic member having the cylindrical cavity extending in the longitudinal direction, it is lighter than the conventional rotor core. Also, no cold brittleness would occur at the extremely-low temperature.

Also, the rotor core 10 according to the embodiment has the cryogen passages extending between the proximal side 100 and the distal side 110, so that the rotor core 10 is sufficiently cooled without using complicated structures in the superconducting rotating machine.

Further, the rod-like member is disposed in each of the cryogen passages to leave a certain gap therearound in the rotor core according to the embodiment, which decreases a cross sectional area of the passage and increases the flow rate of the cryogen and the resultant heat exchange efficiency by the cryogen.

Furthermore, the rotor core 10 according to the embodiment has a number of convex or concave portions in the inner surface of the cryogen passages or in the outer periphery of the rod-like members. This prevents the formation of the boundary layer on the inner surface of the cryogen passages which would otherwise reduces the energy transfer efficiency and allows the major portion of the cryogen to make turbulent contacts with the inner surface of the cryogen passage, which further increases the heat-exchange efficiency.

In addition, the rotor core 10 according to the embodiment has the first cryogen passages for transporting the cryogen from the proximal side 100 to the distal side 110 of the rotor core 10 and also the second cryogen passages for transporting the cryogen from the distal side 110 to the proximal side 100, so that the elongate rotor core 10 extending in the axial direction is uniformly cooled.

The embodiments described above are not restrictive to the invention. Also, the present invention includes all the modifications and equivalents within the scope of the claimed invention.

What is claimed is:

1. A rotor core for use in a superconducting rotating machine, comprising:
    a substantially hollow cylindrical member made of non-magnetic material,
        the cylindrical member having:
            a longitudinal axis,
            a cylindrical cavity defined therein and extending along the longitudinal axis,
            a plurality of recesses defined on an outer peripheral surface of the cylindrical member for receiving superconducting coils,
            a plurality of cryogen passages defined therein adjacent the cylindrical cavity and extending therethrough between a proximal side and a distal side thereof, the cryogen passages having at least two first passages for guiding the cryogen from the proximal side to the distal side and at least two second passages for guiding the cryogen from the distal side to the proximal side and the first and second passages being arranged alternately and spaced at regular intervals with respect to a peripheral direction about the longitudinal axis, a first supply tube having a proximal end connected to proximal ends of the first passages;

a first return tube having a distal end connected to distal ends of the first passages, the first return tube being extended from the distal side to the proximal side through the cylindrical cavity;

a second supply tube extended from the proximal side to the distal side through the cylindrical cavity, the second supply tube having a distal end connected to distal ends of the second passages; and a second return tube having a proximal end connected to proximal ends of the second passages.

2. The rotor core of claim 1, further comprising rod-like members each coaxially disposed in the cryogen passage to leave a space gap around the rod-like member.

3. The rotor core of claim 2, wherein either an inner surface of each of the cryogen passages or an outer surface of each of the rod-like members has convex or concave portions defined therein and extending in a peripheral direction thereof.

4. A superconducting rotating machine having a stator and a rotor, electromagnetically connected with each other, comprising a rotor core defined in claim 1.

5. A rotor core for use in a superconducting rotating machine, comprising:

a substantially hollow cylindrical member made of non-magnetic material, the cylindrical member having:

a longitudinal axis, a cylindrical cavity defined therein and extending along the longitudinal axis, a plurality of recesses defined on an outer peripheral surface of the cylindrical member for receiving superconducting coils, a plurality of cryogen passages defined therein adjacent the cylindrical cavity and extending therethrough between a proximal side and a distal side thereof, the cryogen passages having at least two first passages for guiding the cryogen from the proximal side to the distal side and at least two second passages for guiding the cryogen from the distal side to the proximal side and the first and second passages being arranged alternately and spaced at regular intervals with respect to a peripheral direction about the longitudinal axis, a first supply tube connected to proximal ends of the first passages;

a first return tube connected to distal ends of the first passages and extended from the distal side to the proximal side through the cylindrical cavity;

a second supply tube extended from the proximal side to the distal side through the cylindrical cavity and connected to distal ends of the second passages; and a second return tube connected to proximal ends of the second passages.

* * * * *